United States Patent
Zonoun

(10) Patent No.: US 6,487,172 B1
(45) Date of Patent: Nov. 26, 2002

(54) PACKET NETWORK ROUTE SELECTION METHOD AND APPARATUS USING A BIDDING ALGORITHM

(75) Inventor: Mohammad Reza Zonoun, Sunnyvale, CA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/222,481

(22) Filed: Dec. 29, 1998

Related U.S. Application Data

(60) Provisional application No. 60/097,398, filed on Aug. 21, 1998.

(51) Int. Cl.[7] .............................................. H04L 12/26
(52) U.S. Cl. ........................ 370/238; 370/400; 370/449
(58) Field of Search ................................. 370/238, 396, 370/432, 412, 400, 449

(56) References Cited

U.S. PATENT DOCUMENTS

| | | | |
|---|---|---|---|
| 5,245,607 A | * | 9/1993 | Caram ........................ 370/432 |
| 5,331,635 A | | 7/1994 | Ota |
| 5,398,012 A | * | 3/1995 | Derby et al. ................. 340/826 |
| 5,719,861 A | | 2/1998 | Okanoue |
| 6,047,322 A | * | 4/2000 | Vaid et al. ................... 709/224 |
| 6,246,669 B1 | * | 6/2001 | Chevalier et al. ........... 370/238 |
| 6,292,832 B1 | * | 9/2001 | Shah et al. .................. 709/226 |
| 2001/0038634 A1 | * | 11/2001 | Dally et al. .................. 370/412 |
| 2002/0041593 A1 | * | 4/2002 | Leuca et al. ................. 370/389 |
| 2002/0049762 A1 | * | 4/2002 | Shah et al. ................... 707/10 |

FOREIGN PATENT DOCUMENTS

| | | | |
|---|---|---|---|
| EP | 0568737 A1 | * 5/1992 | ........... H04L/12/56 |
| EP | 0 599 764 A1 | 6/1994 | |

* cited by examiner

Primary Examiner—Hassan Kizou
Assistant Examiner—Lu Yin
(74) Attorney, Agent, or Firm—Blakely Sokoloff Taylor & Zafman LLP

(57) ABSTRACT

A technique for providing a method and apparatus for selecting a route to a destination for a data packet based on routing metrics received in response to a bid broadcast on a network.

39 Claims, 6 Drawing Sheets

| Req. ID 12 | Dest. ID 13 | Request Metric 14 |

| BG | Delay | Cost |
|----|-------|------|
| A1 | — | — |
| A2 | — | — |
| A3 | 0.2 | $0.02 |
| A4 | 0.4 | $0.01 |

PACKET NETWORK ROUTE SELECTION METHOD AND APPARATUS USING A BIDDING ALGORITHM

This application is based on the Provisional Application, Serial No. 60/097,398; filed Aug. 21, 1998; also having the title "Packet Network Route Selection Method And Apparatus Using A Bidding Algorithm."

BACKGROUND OF THE INVENTION

1. Field of the Invention

The present invention relates to the field of data packet delivery across a network and, more specifically, to a bidding algorithm that solicits bids for routing the data packets across the network.

2. Background of the Related Art

The basic practice of exchanging data packets over a communication link is generally known in the art. However, there is an ongoing discussion in the industry for the best way to route packetized data, such as for IP telephony or telephone calls, within the border gateways. The current Border Gateway Protocol (BPG) will have difficulty in routing E.164 calls among the autonomous systems (such as ISPs and large organizations), primarily because the E.164 address spaces are geographically based and separate from the IP address spaces. Hence, there is contention among the autonomous systems for routing the E.164 calls.

The prior art practice requires the use of long and complicated routing tables which list the various links necessary to reach the destination. The use of the table may incur significant delay in looking for an address entry. The delay may be acceptable for text data, but inadequate for voice data over the network. Further, on top of this routing table is a complicated policy layer that sets the conditions and policies for exchanging the data packets between the two destinations, which typically introduces further complexity and delay.

Additionally, when multiple autonomous systems are present, who can provide multiple pathways to the destination, there currently is a lack of adequate contention resolution among the autonomous systems for delivering the packets. Accordingly, it is appreciated that some means of providing for an open contention resolving mechanism at the border gateways would allow for competition among the autonomous systems and may reduce the delay encountered at the border gateway. The present invention describes a contention resolution mechanism based on a bidding algorithm for determining the most desirable route for the transfer of a data packet.

SUMMARY OF THE INVENTION

The present invention describes a method and apparatus for selecting a route to a destination for a data packet. A broadcast is initiated for a request for a bid to transfer the data packet on a network where there are more than one path to the destination. Then, at least one bid is received in response to the broadcast, in which the bid includes a routing metric associated with the transfer of the packet to the destination through a particular path. A desired path to the destination is selected, based on the received routing metric(s).

DETAILED DESCRIPTION OF THE INVENTION

Figure 1:
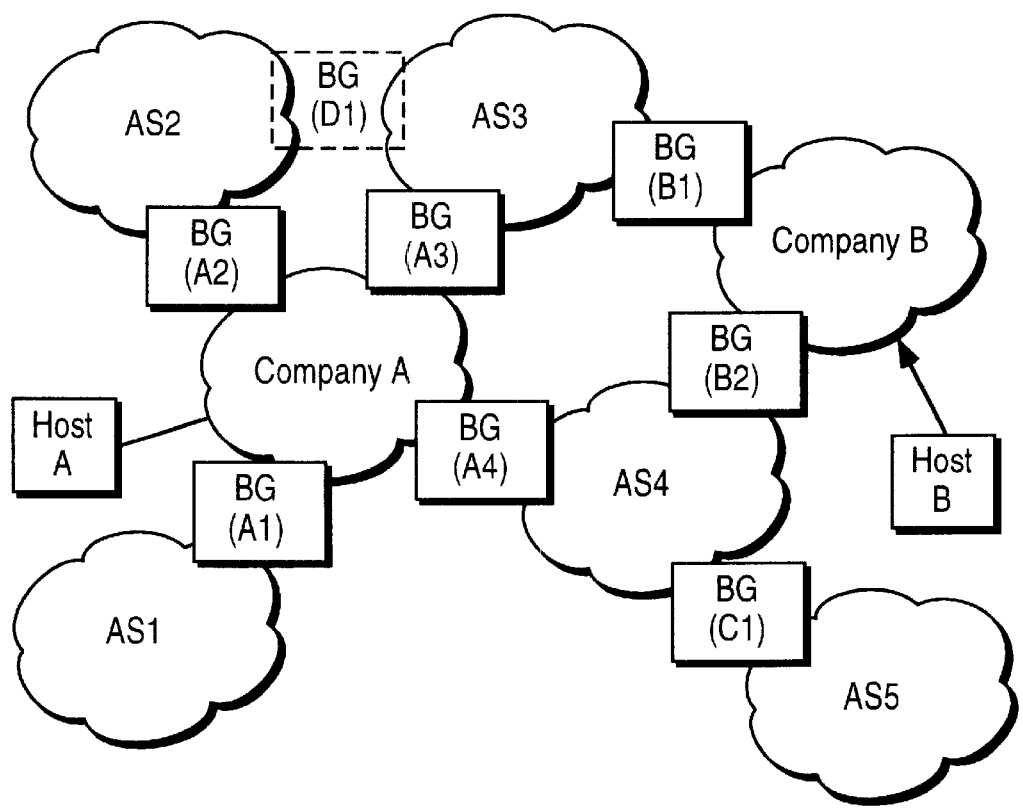
FIG. 1 is a block diagram showing the network environment in which the present invention is utilized to seek bids from various border gates distributed between autonomous systems in order to determine a desired route in sending a data packet to a destination.

Referring to FIG. 1, a scheme for routing data packets by the practice of the present invention is illustrated in reference to a network environment comprised of a plurality of autonomous systems, shown as AS1–AS5. The network environment in the illustrated example is the Internet, however, it is appreciated that the invention can be practiced in other environments as well where data packets are employed. Accordingly, Internet Protocol (IP) is utilized by the various autonomous systems shown to communicate on the network. The autonomous systems are not limited to any particular system and includes, Internet Service Providers (ISPs), wide area networks (WANs), local area networks (LANs), companies, common carriers, etc.

In the example of FIG. 1, a host (Host A) of Company A will send a packet to a destination host (Host B) of Company B. Host A typically would be a computer (such as a Personal Computer (PC)) coupled to Company A's private network and operated by an employee or agent of Company A. Likewise, Host B is a PC operated by Company B. In the hypothetical example, Host A is placing an E.164 call to Host B, in which IP telephony is achieved by the exchange of data packets between Host A and Host B. The example below discusses the transfer of a data packet, but it is understood that data transfer is usually achieved in streaming a plurality of such packets. Again, it is appreciated that the amount or type of packet being transferred is not critical to the understanding of the present invention, since the invention is applicable to data packets in general.

Also, in the hypothetical example, four border gates (also referred to as border gateways), BGs, are shown associated with Company A. These BGs are shown as A1–A4, corresponding to the connections to the autonomous systems AS1–AS4. That is, Company A has access to four autonomous systems AS1–AS4, each through a border gateway A1–A4, respectively. The BGs are known as gates or gateways and generally comprised of some type of processing device and routing capability. The basic operation of BGs is known in the art. Likewise, Company B has access to two autonomous systems AS3 and AS4 through corresponding border gateways B1 and B2. A fifth autonomous system AS5 is shown coupled to AS4 through C1. It is appreciated that AS5 is not connected to neither Company A nor Company B by a border gateway.

As evident from FIG. 1, there are two separate paths (routes) from Company A to Company B. When Host A wants to send a packet to Host B, the data packet can travel from Company A by traversing the route A3/AS3/B1 or A4/AS4/B2 to reach Company B. In the prior art practice, one of the two routes is pre-designated for the particular packet transfer based on the established policy requirement. In the practice of the present invention, an open bidding (and routing) algorithm is utilized to select one of the two routes. The selection as to which route (or path) will depend on a metric set for the packet transfer and the response (returned bid) received.

Figures 2, 3:
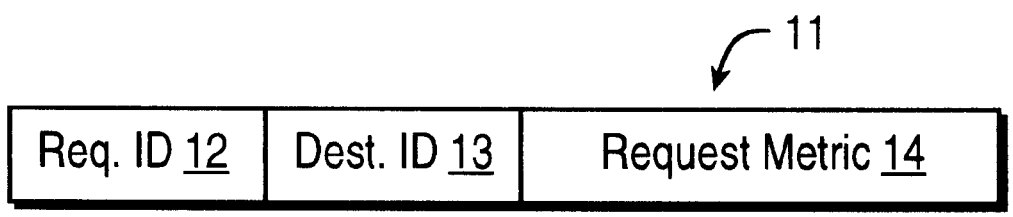
FIG. 2 shows a format of a broadcast in which a criteria for requesting a routing metric included in the broadcast.
FIG. 3 illustrates the generation of a table for determining which responding bid should win the bid for the packet contention.

Thus, when the bidding algorithm of the present invention is utilized, the bidding algorithm posts (broadcasts) a request for a bid from Company A to its border gates A1–A4. The request can take many forms, but an example of a "request for a bid" broadcast 11 is shown in FIG. 2. The broadcast 11 is comprised of a requester's (sender's) identification (ID) field 12, a destination ID field 13 and a request metric field 14, which is comprised of criteria for obtaining a routing metric field 14. The request metric field 14 includes information about the data packet(s) being sent and criteria for the type of routing metric values being sought. In the example and in the practice of the preferred embodiment, two types of metric values are typically being sought. One value sought is the actual cost of sending the packet(s) and the other is the amount of delay in transporting the packet(s) to the destination. It is appreciated that other items of information can be included within the broadcast 11.

In FIG. 1, when Company A attempts to contact Company B for sending the packet, it has available four neighboring autonomous systems to broadcast the request. Accordingly, Company A broadcasts a request for a bid to all of its BGs. If the BGs are using the bidding algorithm, the information is passed through the respective autonomous system to other border gates coupled to the autonomous system. Each BG will then further broadcast the request. By this method, each connected BG will further propagate the broadcast to another autonomous system at the next level through downstream BGs, until the broadcast reaches the last BG which serves the destination address. If the BG is not supporting the bidding algorithm, then it transports the data as it is done under the prior art practice of using routing tables and policy overlays.

Once the closest BG to the destination is reached, the border gate responds by setting up and sending a routing metric back upstream as a bid. The metric contains the values associated with the transfer of the packet at that level. Subsequently, each BG traversed upstream inserts a value to the requested metric by incrementing the values to any downstream metric it receives, until the bid metric reaches all the way back upstream to the original requester. The originating BG will receive bids from those routes available for the transfer of the packet. The routing metric will contain values which the requester can use to select the path. For example, since cost and delay values are utilized in the preferred embodiment, the requester can choose the best route as the least costliest path or as the fastest path.

Thus, in the example shown in FIG. 1, Company A broadcasts the request by posting a bid request 14 to its four BGs, A1–A4. The broadcast states that the destination is Host B at Company B and the criteria solicits cost and delay information for sending a packet (or a stream of packets) to the destination. The cost and delay can be for a single packet or for the streaming of multiple packets. If the BGs support the algorithm, then the broadcast is passed downstream to AS1–AS4. For AS1 and AS2, the destination is not within their domain and no other border gates are present. Therefore, AS1 and AS2 cannot provide a route to reach Company B. Accordingly, in response to the broadcast, either a no response or a response in the negative (depending on how the program is made to respond) is sent back to the BGs A1 and A2. The preference is not to respond at all.

However, AS3 and AS4 can further broadcast the request downstream to its other peer BGs coupled to AS3 and AS4. In this instance A3 further broadcasts the request to B1, while A4 broadcasts to B2 and C1. C1 will not respond since the destination is not within its domain. B1 and B2 can now identify themselves as closest to Company A and each will inform that a connection to company B is available at B1 and B2. B1 and B2 will each respond by submitting a bid metric back upstream in reverse order to how the metric request reached them. Thus, cost and delay calculations in transferring the packet across the AS3 domain are sent upstream to A3. A3 then passes this information to Company A.

A similar routing metric is generated back upstream from the other path through A4, so that Company A receives two bid metric responses from the initial broadcast. FIG. 3 shows a metric entry table (metric table) 15, generated by the algorithm and which table 15 tabulates the values received from the returning bid metrics. As noted, the table establishes entries for each of the border gates. Thus, the A1–A4 entries are listed. Since no valid responses were returned from A1 and A2 within a specified time limit (since the destination cannot be reached through these routes), there are no delay and cost values entered for A1 and A2. However, delay and cost values were returned from the path through A3 and A4. In the example table 15, the cost through AS3 is shown as $0.02, while through AS4 is $0.01. However, the delay is less through AS3 when compared to AS4 (0.2 sec versus 0.4 sec.). Thus, table 15 informs the originator that the route through A4 is half as costly, but the route through A3 is twice as fast.

It is appreciated that the BGs between the sender and the destination will also generate a metric entry table for storing metric value(s) included in the bid(s) which are returned from downstream BGs responding to the broadcast. It is also appreciated that if multiple autonomous systems are traversed to reach the destination, more than one transport value would be generated. In that event, the values of one autonomous system will be incremented to values received from other systems downstream, so that the incremented result will be sent upstream back towards the original requester as a cumulative routing metric. This is shown in the example of FIG. 1 with the inclusion of BG D1 (shown in dashed-line).

If D1 is present, then a connection exists between AS2 and AS3, which allows a path to be designated from Company A to Company B through BG A2. In this instance, A2 will propagate the request broadcast to D1, which in turn propagates it to B1. Once B1 realizes that the destination can be reached, D1 and A3 will receive metric values associated with packet transfer across AS3. As noted above, A3 provides this information to Company A. D1 however provides this information to A2 across AS2. D1 then calculates its cost and delay values associated with AS2 and increments the received metric values from B1 (stored in a metric table) by the amount of its values. The incremented bid metric (representing the costs for transporting the packet across both AS3 and AS2) is then sent upstream to A2 and ultimately as BG A2 entries in the table 15 of FIG. 3.

Clearly, Company A would choose the A3/AS3/B1 path over the A2/AS2/D1/AS3/B1 path, since both cost and delay would be greater through the longer path. The example is shown to illustrate the aspect of the invention in which a multitude of paths can exist between the sender and the recipient of the packet. Where multiple levels are encountered, each can be solicited for a bid and the returned routing metric compared to designate the most desirable route. Furthermore, in paths where multiple costs and delay values are present, the values can be incremented at appropriate levels as the routing metric is sent back upstream to provide a cumulative value.

When the cumulative routing metric values are returned to the requester (Company A in the example), the requester has collected information for resolving the contention by the BGs. The requester can set the parameters for resolving the contention. For example, company A can select the least expensive route. This approach may be desirable when sending text data packets to Company B. However, for telephony communication where real time conversation is more critical, the path with the least delay may be more attractive. Likewise, a compromise equation can be set for obtaining the most optimum cost/delay factors. The basis for the best or most desirable route selection is a choice available for programming within the algorithm.

In those instances where a particular BG receives more than one bid, a similar or simpler contention resolving mechanism can be employed to resolve contentions. In that way, a BG receiving multiple downstream bid entries can resolve the contention and submit only one bid metric upstream.

Figure 4:
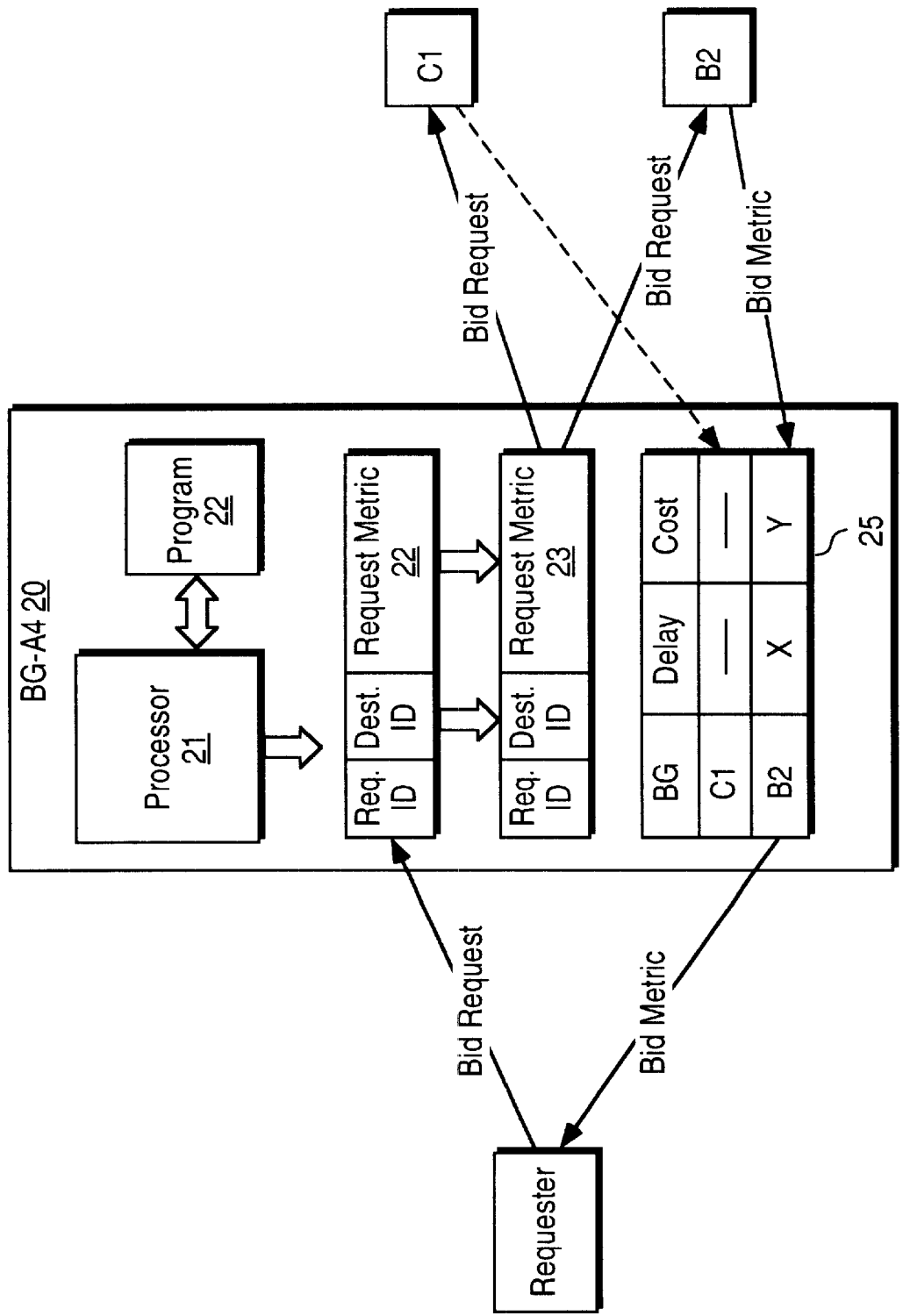
FIG. 4 is a schematic diagram showing a router at a border gate and the implementation of the bidding algorithm of the present invention at the border gate.

It is appreciated that there are a number of ways to design and implement a routing system supporting the bidding algorithm for the practice of the present invention. One example system is illustrated in FIG. 4. In FIG. 4, a processing device 20 is shown representing the controlling device at a border gateway. Generally, the processing device 20 is comprised of a processor, computer, server and/or a router (hence, device 20 is hereafter referred to simply as router 20). The particular example router is that of the device present at the border gate A4 of FIG. 1. It is appreciated that the general operation of border gates is known in the art. It is also appreciated that the BG of FIG. 4 is shown as a single unit for ease of understanding, but in practice, the BG may be a distributed system. Thus, it is to be noted that portions of the router 20 may reside at different physical locations.

The router 20 is comprised of a processor 21. The processor 21 is controlled by a program 22, which is typically stored in a storage medium, such as a memory component or a magnetic disk. The program 22 includes the bidding algorithm for practicing the invention as described above. The router will generally include a register 22 for receiving the bid request and the same or different register 23 for further broadcasting the request. The requester ID is now replaced by its own requester ID since the BG is now soliciting the bid from a unit downstream. The destination and the criteria for the bid need not change and continue to be rebroadcast. The program also sets a metric entry table 25, which is equivalent to the table 15 of FIG. 3 for entering the retrieved metric values. The table 25 is typically set in memory for storing the metric values.

Thus, in the example, a request for a bid is received by router 20 when broadcast by the requester upstream in the chain, which can be the host sender or one of the border gates. The router 20, after receiving the request, processes the request and further broadcasts the request since the destination is not within its domain. In the example, border gates C1 and B2 receive the rebroadcast from A4. A bid metric response is returned by the valid border gate(s), which is B2 in the example. C1 would not return a response within the allotted time limit, so that the router 20 will disregard the C1 entries in table 25. The returned cost and delay values from B2 are entered in the table 25 (shown as X and Y for B2). If the values need to be incremented, the router will generate the cumulative value for sending it upstream back toward the requester.

The algorithm present in the program 22 is utilized to control the router 20 so that it will respond appropriately with the bid requests and the returning metric values. It is appreciated that the algorithm is generally in the form of software or firmware for controlling the operation of the processor 21. Again, the device 20 of FIG. 4 can be distributed at multiple locations, however, would function as shown. An example flow chart of the algorithm for practicing the invention is shown in FIGS. 5–7.

Figure 5:
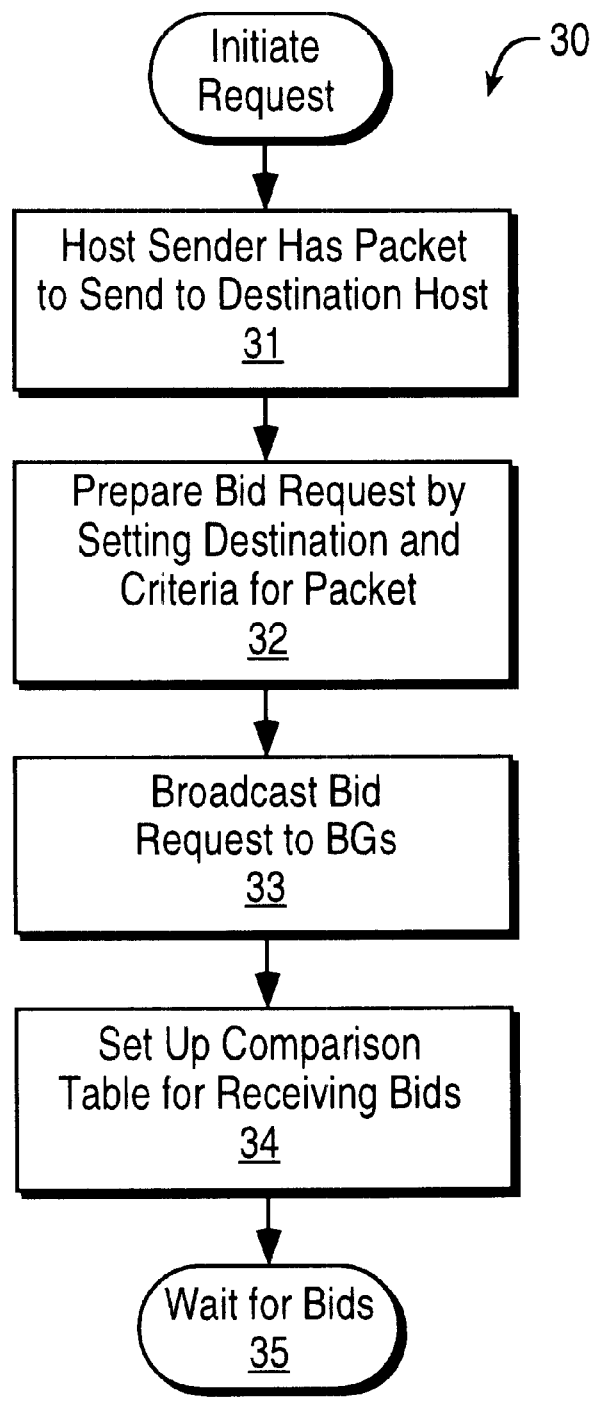
FIG. 5 is a flow diagram illustrating a routine of the bidding algorithm for the initiation of the request for a bid by the requestor sending the data packet.

In FIG. 5, an example bid initiating routine 30 of the algorithm is shown. A host initiates a request when the host has a packet to send to a designated destination (shown in block 31). The bid request is prepared, in which the destination address and criteria associated with the packet transfer are included in the request being sent to the border gates (shown in block 32). The bid request is broadcast to the border gates (shown in block 33). The host then sets up the comparison table (shown in block 34) and waits for the return of the bids in response to the broadcast (shown in block 35).

Figure 6:
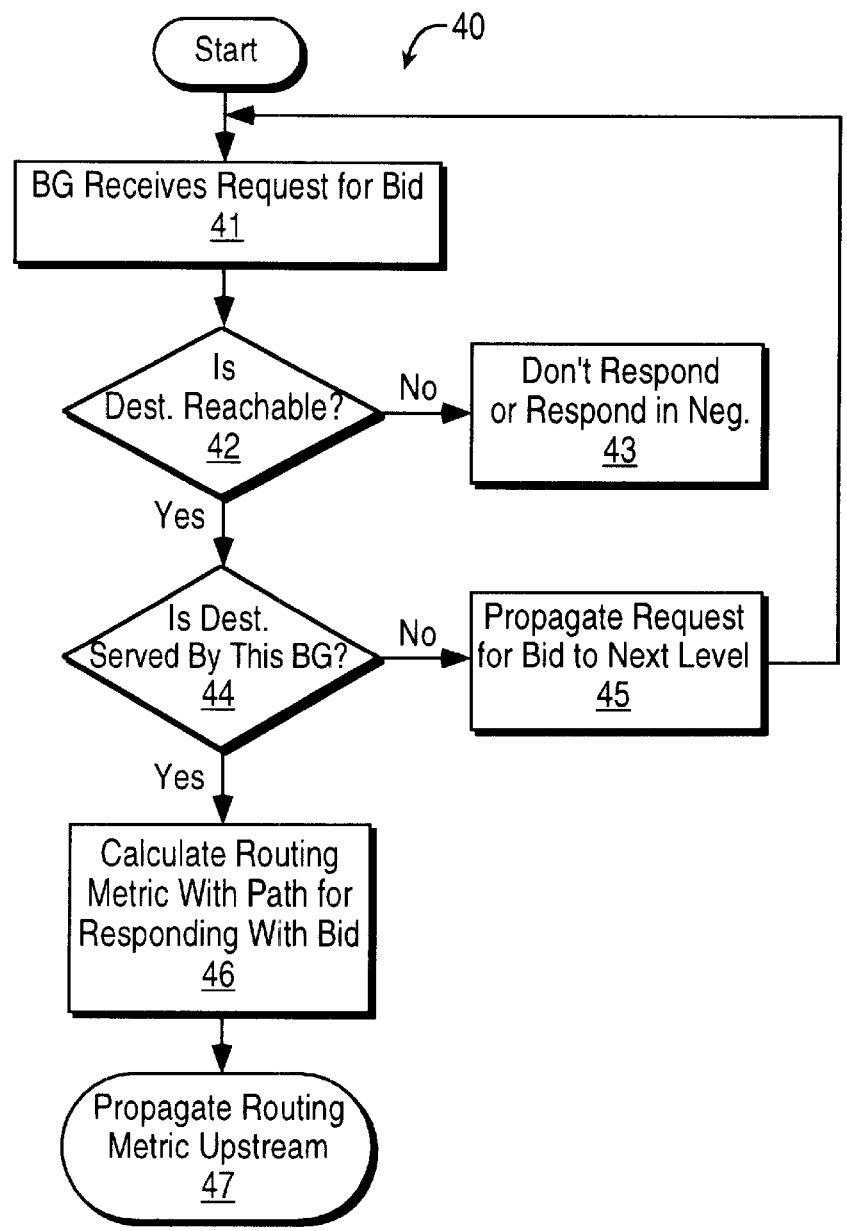
FIG. 6 is a flow diagram illustrating a routine of the bidding algorithm for the handling of a bid request at a border gate, when the request is sent downstream.
Figure 7:
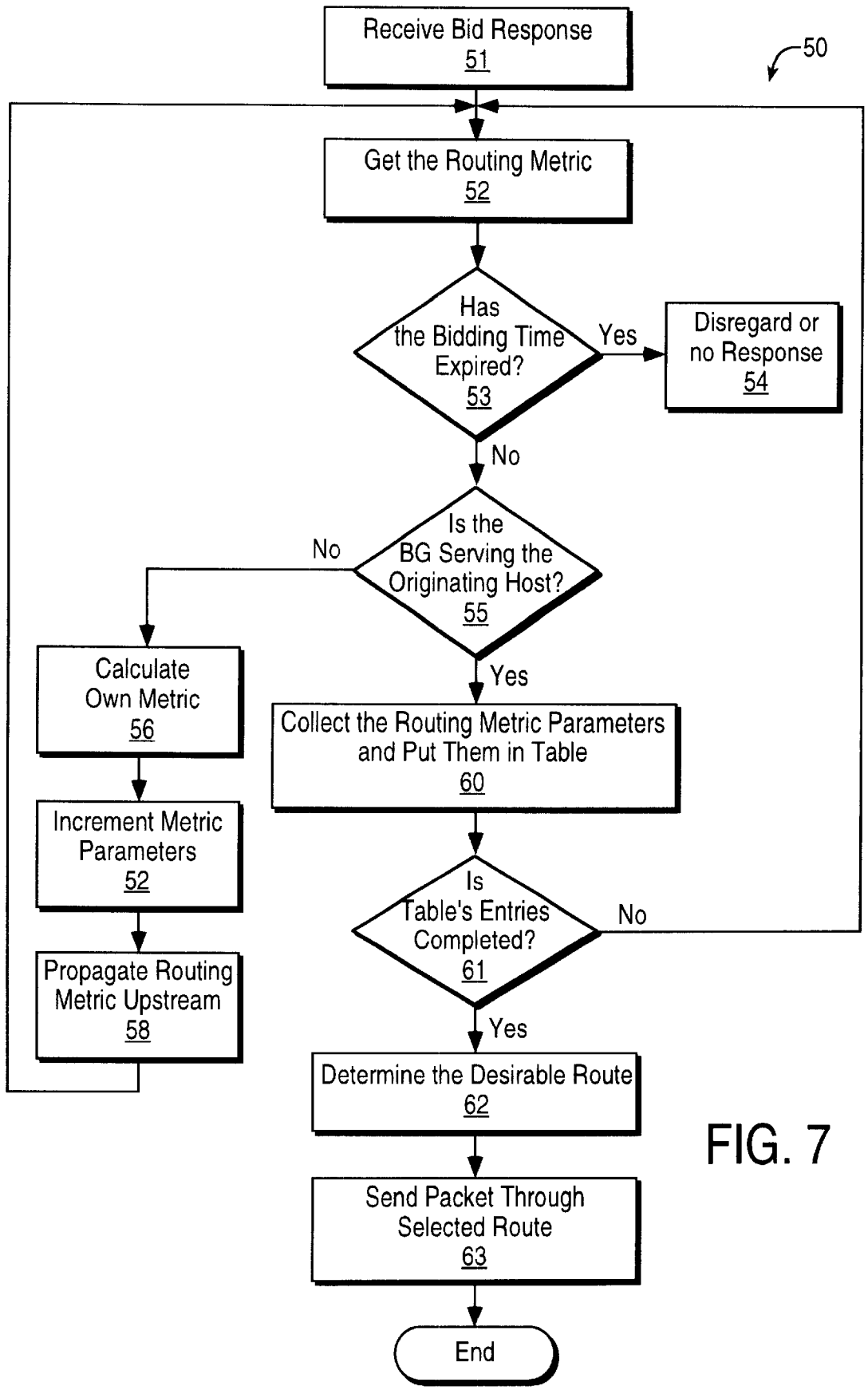
FIG. 7 is a flow diagram illustrating a routine of the bidding algorithm for receiving bids sent upstream and the selection of the desired route for data packet transfer.

In FIG. 6, an example routine 40 utilized within a border gate for handling a bid request, when the bid request is sent downstream, is illustrated. The BG receives the broadcast from an upstream requester (whether it be the host or another BG) for processing (shown in block 41) and checks to determine if the destination is not reachable (shown in block 42). If not reachable, then it does not respond at all or responds in the negative (shown in block 43). Again, the preference is not to respond. If the destination is reachable or if the BG is uncertain if it can be reached, then it proceeds to the next step (shown in block 44) to determine if the destination is within the present domain. If the destination is not reachable at the present domain, the bid request is propagated to the next level downstream (shown in block 45) and the sequence of routine 40 is repeated at the downstream BG. If the destination is served by the present BG, then the routing metric is calculated (shown in block 46) and propagated upstream (shown in block 47).

When the BG propagates the request downstream, it waits for a response from the downstream device. Usually, a time period is specified for the return of a bid once a request is broadcast. If a bid is returned within the allotted time, the BG obtains the bid and stores the metric values in its metric table for its calculation or for propagating it upstream. The steps for sending a bid upstream is shown in FIG. 7.

FIG. 7 shows a routine 50 when bids are returned upstream for further upstream propagation or for selecting the desired route for transferring the data packet. Accordingly, as shown in FIG. 7, a BG assumes that there are downstream devices (if a request for a bid was sent downstream) and waits for the return response(s). When a bid response is received (shown in block 51), the routing metric is obtained (shown in block 52). The metric value(s) can be stored in a metric table at the border gate, if desired and the algorithm is set up to do so. The returning metric is valid, provided the waiting period for the bid has not expired (shown in block 53). If the waiting period has expired, any response returning after the wait time lapse is disregarded.

Thus, non-responding BGs and BGs late in returning a response are disregarded by the routine after time out (shown in block 54).

If the waiting time period has not lapsed for the returning bid metric, the response to the bid metric(s) obtained will depend on the BG's connection to the originating host. If the particular BG is not serving the originating host (shown in block 55), then its own routing metric values are determined (shown in block 56) and incremented to the metric obtained from downstream (shown in block 57). The incremented (cumulative) metric is propagated upstream (shown in block 58) and the routine 50 is repeated at the next upstream BG.

However, if the particular BG is serving the originating host (shown in block 55), the metric is collected in the metric table for the host (shown in block 60). If the table entries are not complete, other metrics are sought from other BGs. The table entries are complete, when all entries are received or when the wait time has lapsed (shown in block 61). If multiple valid table entries are present, the algorithm uses a particular decision-making parameter based on the received metric values for selecting the most desirable path. The desirable route is selected (shown in block 62), followed by the sending of the data packet or packets through the selected route (shown in block 63).

It is appreciated that some of the steps shown in the routine can be performed in parallel with other steps. Furthermore, when a border gate receives more than one bid from downstream BGs, a similar decision-making process can be implemented at the BG for selecting one bid for upstream propagation. The appropriate bid response selected can be based on the defined packet criteria being sent downstream and/or the criteria established by the host. Accordingly, the particular BG can collect multiple entries in its table, determine which downstream path is most desirable, increment its routing metric values to the one selected downstream path and send the cumulative metric upstream.

Thus, the practice of the present invention allows a host to post a request for a bid for delivering the packet to a particular destination and in which certain criteria associated with the packet is also included in the posting. The bidding request is propagated downstream toward the destination, in which the propagation path may take more than one route. When the closest BG to the destination is reached for each path that can support the bidding algorithm, the routing metric responses to the solicited packet criteria are propagated in reverse back upstream. Each BG along the path increments to the metric to reflect its portion of the path and the final cumulative metric is returned to the original requester of the bids. When multiple bids are returned, the host can collect and utilize the returned metric to set parameters for selecting the most desirable path for sending the data packet(s). The BG can also discriminate between the bids it receives from downstream.

In the preferred embodiment, cost and delay values are included within the routing metric. The cost value is the cost in monetary terms (dollars, for example) in sending the packet, while delay is measured in terms of time (for example, seconds). Thus, the host can determine which path provides the most cost savings or which path provides the least delay, in order to select one winning bid as the desired path. This choice allows distinguishing the most effective path for a given type of data being sent across the network. For example, text data can be sent by the less costly path, while telephony may opt for the path with the least delay.

It is appreciated that the type of metric being returned need not rely on cost or delay only. Other metric values can be ready sought. For example, cost can be termed in variation from a standard set rate (instead of actual dollars cost). Other metric values may address bandwidth across the path, so that paths with low bandwidth properties could be bypassed. Thus, the invention can be readily practiced utilizing a variety of different metrics.

Furthermore, the invention can be practiced in the sending of single packets, multiple packets, as well as the streaming of multiple packets. The invention was described in reference to networks utilizing the Internet Protocol across the Internet, however, the invention can be practiced on other networks as well. Therefore, the packet network can include IP, ATM (Asynchronous Transfer Mode), LANs, WANs, ETHERNET and SONET (Synchronous Optical Network).

Thus, a packet network route selection method and apparatus using a bidding algorithm is described. It is also appreciated that the bidding algorithm of the present invention can readily replace existing algorithms, such as the prior art algorithm utilized in current BGPs, in order to allow existing devices to practice the present invention. The present invention provides for an open market packet exchange, allowing for a competitive environment for packet exchange, as well as a virtual exchange, where individual autonomous systems can obtain the capability to transport packets once connected to the network.

I claim:

1. A method of selecting a route to a destination for a data packet comprising:

broadcasting a request for a bid to transfer the data packet on a network where there are more than one path to the destination;

receiving at least one bid in response to the broadcast request, the bid including a routing metric associated with the transfer of the packet to the destination through a particular path;

selecting a desired path to the destination based on the received routing metric.

2. The method of claim 1 wherein the receiving of the routing metric includes a cost value which specifies a cost of transporting the packet to the destination.

3. The method of claim 1 wherein the receiving of the routing metric includes a delay value which specifies a time duration required for transporting the packet to the destination.

4. The method of claim 1 wherein the receiving of the routing metric includes a cost value which specifies a cost in monetary terms of transporting the packet to the destination and a delay value which specifies a time duration required for transporting the packet to the destination, and the selecting of the desired path is based on the cost and delay values for a type of data packet being transferred.

5. The method of claim 1 wherein the broadcasting of the request for the bid is for transferring a plurality of packets.

6. The method of claim 1 further comprises the resolving of a contention for the packet when more than one bid is received, wherein the received routing metrics are analyzed based on established parameters for the selecting of a winning bid for the desired path to the destination.

7. A method of selecting a route to a destination for a data packet comprising:

broadcasting a request for a bid to transfer the data packet on a network where there are multiple paths to the destination through multiple systems on the network for transporting the packet;

receiving bids in response to the broadcast request, each bid including a routing metric associated with the transfer of the packet to the destination through a particular path;

analyzing the received routing metric using established routing parameters;

selecting a desired path to the destination based on the analysis of the received routing metric.

8. The method of claim 7 wherein the receiving of the routing metric includes a cost value which specifies a cost of transporting the packet to the destination.

9. The method of claim 7 wherein the receiving of the routing metric includes a delay value which specifies a time duration required for transporting the packet to the destination.

10. The method of claim 7 wherein the receiving of the routing metric includes a cost value which specifies a cost in monetary tom of transporting the packet to the destination and a delay value which specifies a time duration required for transporting the packet to the destination, and the selecting of the desired path is based on the cost and delay values for a type of data packet being transferred.

11. The method of claim 7 wherein the broadcasting of the request for the bid is for transferring a plurality of packets.

12. The method of claim 7 further comprises the resolving of a contention for the packet by multiple bids, wherein the analyzing of the received routing metrics is based on the type of data packet being transferred.

13. The method of claim 7 wherein the network is a member of the group consisting of IP, ATM, ETHERNET and SONET.

14. A method of submitting a bid by a border gate on a network for routing of a data packet through the border gate to a destination comprising:

receiving a request for a bid to transfer the data packet through a path which includes the border gate, determining a routing metric associated with the transfer of the packet to the destination through the border gate;

submitting a bid which includes the routing metric to a sander of the request for a bid.

15. The method of claim 14 wherein the determining of the routing metric includes a cost value which specifies a cost in monetary terms of transporting the packet to the destination.

16. The method of claim 14 wherein the determining of the routing metric includes a delay value which specifies a time duration required for transporting the packet to the destination.

17. The method of claim 14 further comprises the incrementing of the routing metric to a downstream routing metric received from a downstream border gate before submitting the bid upstream.

18. A method of submitting a bid by a border gate on a network for routing of a data packet through the border gate to a destination comprising:

receiving a request for a bid from a requester upstream to transfer the data packet through a path which includes the border gate;

rebroadcasting the request for a bid downstream towards the destination if another border gate resides in the path prior to reaching the destination;

determining a routing metric associated with the transfer of the packet from up to the border gate;

receiving a downstream bid, which includes a downstream routing metric, from a downstream gateway;

incrementing the routing metric to the downstream routing metric received;

submitting a bid based on the routing metric or a cumulative of the routing metric and the downstream routing metric to an upstream sender of the request for the bid.

19. The method of claim 18 wherein the determining of the routing metric and the downstream routing metric if there is one, includes a cost value in monetary terms which specifies a cost of transporting the packet to the destination.

20. The method of claim 18 wherein the determining of the routing metric and the downstream routing metric if there is one, includes a delay value which specifies a time duration required for transporting the packet to the destination.

21. The method of claim 18 wherein the receiving of the request for the bid is for transferring a plurality of packets.

22. A machine readable medium having resident thereon programmed instructions for selecting a route to a destination for a data packet on a network, the instructions when executed by a processor, causes the processor to perform comprising:

broadcasting a request for a bid to transfer the data packet on the network where there are more than one path to the destination;

receiving at least one bid in response to the broadcast request, the bid including a routing metric associated with the transfer of the packet to the destination through a particular path;

selecting a desired path to the destination based on the received routing metric.

23. The machine readable medium of claim 22 wherein the receiving of the routing metric includes a cost value in monetary terms which specifies a cost of transporting the packet to the destination.

24. The machine readable medium of claim 22 wherein the receiving of the routing metric includes a delay value which specifies a time duration required for transporting the packet to the destination.

25. The machine readable medium of claim 22 wherein the receiving of the routing metric includes a cost value which specifies a cost of transporting the packet to the destination and a delay value which specifies a time duration required for transporting the packet to the destination, and the selecting of the desired path is based on the cost and delay values for a type of data packet being transferred.

26. The machine readable medium of claim 22 wherein the broadcasting of the request for the bid is for transferring a plurality of packets.

27. The machine readable medium of claim 22 further comprises the resolving of a contention for the packet when more than one bid is received, wherein the received routing metrics are analyzed based on established parameters for the selecting of a winning bid for the desired path to the destination.

28. A machine readable medium having resident thereon programmed instructions for submitting a bid by a border gate on a network for routing of a data packet through the border gate to a destination, the instructions when executed by a processor, causes the processor to perform comprising:

receiving a request for a bid to transfer the data packet through a path which includes the border gate;

determining a routing metric associated with the transfer of the packet to the destination through the border gate;

submitting a bid which includes the routing metric to a sender of the request for a bid.

29. The machine readable medium of claim 28 wherein the determining of the routing metric includes a cost value in monetary terms which specifies a cost of transporting the packet to the destination.

30. The machine readable medium of claim 28 wherein the determining of the routing metric includes a delay value which specifies a time duration required for transporting the packet to the destination.

31. The machine readable medium of claim 28 further comprises the incrementing of the routing metric to a downstream routing metric received from a downstream border gate before submitting the bid upstream.

32. An apparatus for selecting a route to a destination for a data packet comprising:

a processor;

a table in memory for storing a metric value, said memory coupled to said processor, said processor broadcasting a request for a bid to transfer the data packet on a network where there are more than one path to the destination and receiving at least one bid in response to the broadcast request, the bid including the routing metric associated with the transfer of the packet to the destination through a particular path, in which the routing metric is stored in said table;

said processor selecting a desired path to the destination based on the received routing metric.

33. The apparatus of claim 32 wherein the routing metric includes a cost value in monetary terms which specifies a cost of transporting the packet to the destination.

34. The apparatus of claim 32 wherein the routing metric includes a delay value which specifies a time duration required for transporting the packet to the destination.

35. The apparatus of claim 32 wherein said processor further resolves a contention for packet when more than one bid is received, wherein the received routing metrics are analyzed based on established parameters in order for said processor to select a winning bid for the desired path to the destination.

36. A border gate for submitting a bid on a network for routing of a data packet to a destination comprising:

a processor;

a table in memory for storing a metric value, said memory coupled to said processor;

said processor receiving a request for a bid transfer the data packet through a path which includes the border gate and determining its routing metric associated with the transfer of the packet to the destination through the border gate;

said processor weaving a downstream routing metric from a downstream border gate and storing the downstream routing metric in said table;

said processor incrementing its routing metric to the stored downstream routing metric and submitting an incremented result as a bid upstream to a sender of the request for a bid.

37. The border gate of claim 36 when the routing metric includes a cost value in monetary terms which specifies a cost of transporting the packet to the destination.

38. The border gate of claim 36 wherein the determining of the routing metric includes a delay value which specifies a time duration required for transporting the packet to the destination.

39. The border gate of claim 36 in which the submitted bid is in response to a request for transferring a plurality of packets.

* * * * *

UNITED STATES PATENT AND TRADEMARK OFFICE
CERTIFICATE OF CORRECTION

PATENT NO. : 6,487,172 B1
DATED : November 26, 2002
INVENTOR(S) : Zonoun

It is certified that error appears in the above-identified patent and that said Letters Patent is hereby corrected as shown below:

Column 9,
Line 16, please delete "monetary tom" and insert -- monetary terms --.
Line 34, please delete "gate," and insert -- gate; --.
Line 38, please delete "sander" and insert -- sender --.
Line 62, please delete "packet from up" and insert -- packet from upstream --.

Column 11,
Line 30, after "contention for" please insert -- the --.

Column 12,
Line 11, please delete "weaving" and insert -- receiving --.
Line 18, please delete "claim 36 when" and insert -- claim 36 wherein --.

Signed and Sealed this

Twenty-ninth Day of June, 2004

JON W. DUDAS
*Acting Director of the United States Patent and Trademark Office*